United States Patent
Wu (10) Patent No.: US 11,333,945 B2
(45) Date of Patent: May 17, 2022

(54) DISPLAY PANEL AND DISPLAY APPARATUS

(71) Applicant: HKC CORPORATION LIMITED, Shenzhen (CN)

(72) Inventor: Chuan Wu, Chongqing (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 17/042,082

(22) PCT Filed: Dec. 12, 2018

(86) PCT No.: PCT/CN2018/120467
§ 371 (c)(1),
(2) Date: Sep. 25, 2020

(87) PCT Pub. No.: WO2020/113630
PCT Pub. Date: Jun. 11, 2020

(65) Prior Publication Data
US 2021/0011350 A1   Jan. 14, 2021

(30) Foreign Application Priority Data
Dec. 5, 2018 (CN) .......................... 201811479528.6

(51) Int. Cl.
*G09G 3/36* (2006.01)
*G02F 1/1362* (2006.01)
*G02F 1/1368* (2006.01)

(52) U.S. Cl.
CPC ...... *G02F 1/136286* (2013.01); *G02F 1/1368* (2013.01); *G09G 3/3688* (2013.01)

(58) Field of Classification Search
CPC ......... G09G 3/3614; G09G 2300/0823; G09G 3/3611; G09G 2310/0262
See application file for complete search history.

(56) References Cited

U.S. PATENT DOCUMENTS

2006/0120160 A1* 6/2006 Park ..................... G09G 3/3648
365/185.22
2013/0128168 A1* 5/2013 Kim .................. G02F 1/133707
349/42

(Continued)

FOREIGN PATENT DOCUMENTS

CN          102269905 A      12/2011
CN          104317086 A       1/2015

(Continued)

OTHER PUBLICATIONS

Dun Zhang, the ISA written comments, Jul. 2019, CN.
Dun Zhang, the International Search Report, dated Jul. 2019, CN.

*Primary Examiner* — Mariam Qureshi (57) ABSTRACT

This application discloses a display panel and a display apparatus. The display panel includes a substrate on which data lines, gate lines, pixels, and a gate driver chip are arranged, where the gate driver chip outputs gate enable signals to the gate lines to turn on the pixels; each row of pixels include a plurality of pixel groups, each of the pixel groups includes a first column of pixel and a second column of pixel, the first column of pixel and the second column of pixel are connected to the same data line, and the first column of pixel and the second column of pixel are connected to two different gate lines; and the channel width-to-length ratio of an active switch corresponding to the second column of pixel is greater than that corresponding to the first column of pixel.

6 Claims, 5 Drawing Sheets

(56) References Cited

U.S. PATENT DOCUMENTS

| | | | | |
|---|---|---|---|---|
| 2017/0213508 A1* | 7/2017 | Zhang | ............... | G09G 3/3648 |
| 2018/0053478 A1* | 2/2018 | Xu | ............... | G09G 3/3677 |
| 2019/0259327 A1* | 8/2019 | Li | ............... | G09G 3/3233 |
| 2020/0013806 A1* | 1/2020 | Su | ............... | G09G 3/2085 |

FOREIGN PATENT DOCUMENTS

| | | |
|---|---|---|
| CN | 104391411 A | 3/2015 |
| CN | 104865763 A | 8/2015 |
| CN | 105489185 A | 4/2016 |
| CN | 107065354 A | 8/2017 |
| CN | 107991818 A | 5/2018 |
| JP | 2007017928 A | 1/2007 |

\* cited by examiner

DISPLAY PANEL AND DISPLAY APPARATUS

This application claims the priority to Chinese Patent Application No. 201811479528.6, filed with National Intellectual Property Administration, PRC on Dec. 5, 2018 and entitled "DISPLAY PANEL AND DISPLAY APPARATUS", which is incorporated by reference in its entirety.

TECHNICAL FIELD

This application relates to the field of display technologies, and in particular, to a display panel and a display apparatus.

BACKGROUND

Statement herein merely provides background information related to this application and does not necessarily constitute the existing technology.

With development and advancement of science and technologies, due to hot spots such as thinness, power saving, and low radiation, liquid crystal displays become mainstream products of displays and are widely applied. Most of LCDs in the current market are backlight-type LCDs. A backlight-type LCD includes an LCD panel and a backlight module. The working principle of the liquid crystal panel is: Liquid crystal molecules are placed between two parallel glass substrates, and a drive voltage is applied across the two glass substrates to control rotating directions of the liquid crystal molecules, so that light in the backlight module is refracted out to generate an image.

Half-Source Driver (HSD) is a low-cost production scheme commonly used in the display panel industry. This scheme doubles the number of scan lines, so that a single data line may correspond to two adjacent columns of sub-pixels, which saves half of source driver integrated chips, but may cause vertical bright and dark lines.

SUMMARY

This application provides a display panel and a display apparatus to realize brightness balance.

To achieve the above objective, this application provides a display panel, including a substrate on which a plurality of data lines, a plurality of gate lines, a plurality of pixels, and a gate driver chip are arranged, where the pixels include sub-pixels of different colors arranged along the direction of the gate lines respectively; the gate driver chip outputs gate enable signals to the gate lines to turn on the pixels: each row of the pixels includes a plurality of pixel groups, each of the pixel groups includes a front first column of pixel and a back second column of pixel that are adjacent, the first column of pixel and the second column of pixel are connected to the same data line, and the first column of pixel and the second column of pixel are connected to two different gate lines; data drive signals used by each pixel group and the adjacent pixel group in each row of pixels are opposite in polarity; and the channel width-to-length ratio of an active switch corresponding to the second column of pixel is greater than that of an active switch corresponding to the first column of pixel.

Optionally; the data drive voltages corresponding to the first column of pixel and the second column of pixel are opposite in polarity, the first column of pixel is an odd column of pixel, and the second column of pixel is an even column of pixel; and the channel width-to-length ratio of an active switch corresponding to the even column of pixel is greater than that of an active switch corresponding to the odd column of pixel.

Optionally, the charging voltages of the odd column of pixel and the even column of pixel are the same.

Optionally, the odd column of pixel includes a first active switch and a first sub-pixel, the even column of pixel includes a second active switch and a second sub-pixel, the data line is connected with a drain electrode of the first active switch and a drain electrode of the second active switch, a source electrode of the first active switch is connected to the first sub-pixel, and a source electrode of the second active switch is connected to the second sub-pixel, where (W/L) odd=m*(W/L) even, in being more than or equal to 0.5 and less than 1.

Optionally, the value of m is one of 0.5, 0.6, 0.7, 0.8, and 0.9.

Optionally, the value of m is one of 0.55, 0.65, 0.75, 0.85, and 0.95.

Optionally, the channel width-to-length ratio satisfies a formula $$(W/L) = \frac{\pi}{\ln\frac{2c + \pi b}{2c + \pi a}},$$

where W is channel width, L is channel length, a is radius of a source semicircle region, b is horizontal distance from the center of a semicircle to the drain electrode, and c is length of a parallel region of two sides of the drain electrode; and the channel width-to-length ratio W/L of the second active switch is greater than the channel width-to-length ratio W/L of the first active switch.

Optionally, the data drive voltages corresponding to the first column of pixel and the second column of pixel are the same in polarity, the first column of pixel is an even column of pixel, and the second column of pixel is an odd column of pixel; and the channel width-to-length ratio of an active switch corresponding to the odd column of pixel is greater than that of an active switch corresponding to the even column of pixel.

Optionally, the even column of pixel includes a first active switch and a first sub-pixel, the odd column of pixel includes a second active switch and a second sub-pixel, the data line is connected with a drain electrode of the first active switch and a drain electrode of the second active switch, a source electrode of the first active switch is connected to the first sub-pixel, and a source electrode of the second active switch is connected to the second sub-pixel, where m*(W/L) odd= (W/L) even, in being more than or equal to 0.5 and less than 1.

Optionally, the value of m is one of 0.5, 0.55, 0.6, 0.65, 0.7, 0.75, 0.8, 0.85, 0.9, and 0.95.

Optionally, the channel width-to-length ratio satisfies a formula $$(W/L) = \frac{\pi}{\ln\frac{2c + \pi b}{2c + \pi a}},$$

where W is channel width, L is channel length, a is radius of a source semicircle region, b is horizontal distance from the center of the semicircle to the drain electrode, and c is length of a parallel region of two sides of the drain electrode; and the channel width-to-length ratio W/L of the second active switch is greater than the channel width-to-length ratio W/L of the first active switch.

Optionally, the display panel further includes a detection circuit that detects and compares brightness of the first column of pixel and the second column of pixel; if the first column of pixel is dark, charging time C1 corresponding to the first column of pixel and charging time C2 corresponding to the second column of pixel are adjusted, so that C1 is greater than C2; and if the first column of pixel is bright, the charging time C1 corresponding to the first column of pixel and the charging time C2 corresponding to the second column of pixel are adjusted, so that C1 is smaller than C2.

Optionally, the charging time of the first column of pixel and that of the second column of pixel are controlled by a timing control chip.

Optionally; the display panel uses a half-source driver.

This application discloses a display panel, including: a substrate on which a plurality of data lines, a plurality of gate lines, a plurality of pixels, and a gate driver chip are arranged, where the pixels include sub-pixels of different colors arranged along the direction of the gate lines respectively; the gate driver chip outputs gate enable signals to the gate lines to turn on the pixels; each row of the pixels includes a plurality of pixel groups, each of the pixel groups includes a front first column of pixel and a back second column of pixel that are adjacent, the first column of pixel and the second column of pixel are connected to the same data line, and the first column of pixel and the second column of pixel are connected to two different gate lines; data drive signals used by each pixel group and the adjacent pixel group in each row of pixels are opposite in polarity; data drive voltages corresponding to the first column of pixel and the second column of pixel are opposite in polarity; the first column of pixel is an odd column of pixel, and the second column of pixel is an even column of pixel; the odd column of pixel includes a first active switch and a first sub-pixel, the even column of pixel includes a second active switch and a second sub-pixel, the data line is connected with a drain electrode of the first active switch and a drain electrode of the second active switch, a source electrode of the first active switch is connected to the first sub-pixel, and a source electrode of the second active switch is connected to the second sub-pixel; (W/L) odd=m*(W/L) even, where m is more than or equal to 0.5 and less than 1; a channel width-to-length ratio satisfies a formula $$(W/L) = \frac{\pi}{\ln\frac{2c+\pi b}{2c+\pi a}},$$

where W is channel width, L is channel length, a is radius of a source semicircle region, b is horizontal distance from the center of the semicircle to the drain electrode, and c is length of a parallel region of two sides of the drain electrode; and the channel width-to-length ratio W/L of the second active switch is greater than the channel width-to-length ratio W/L of the first active switch.

This application further discloses a display apparatus, including the foregoing display panel.

Optionally, the display apparatus is one of a twisted nematic display apparatus, an in-plane switching display apparatus, and a multi-domain vertical alignment display apparatus.

The positive and negative polarity conversion of the data line causes the data drive voltage corresponding to the second column of pixel in a current group to take a period of time to reverse to a preset voltage level, so that the charging voltage and charging state of the second column of pixel are lower than those of the first column of pixel in a next group of the same row, which finally causes a charging voltage difference of the pixels and vertical bright and dark lines. In this solution, if the channel width-to-length ratio of a thin film transistor is larger, on-state current is heavier, and the charging capability is stronger; with such design, the channel width-to-length ratio of the thin film transistor corresponding to the second column of pixel in the current group is larger than that of the first column of pixel in the next group in the same row, and the charging efficiency and charging capability of the second column of pixel are then stronger than those of the first column of pixel, so as to cancel the phenomenon that the charging voltage of the second column of pixel is lower than that of the first column of pixel, thereby reducing and even eliminating the difference in the final charging states of the both, causing the charging voltages of the two adjacent pixels to be the same, and avoiding visual vertical bright and dark lines.

BRIEF DESCRIPTION OF DRAWINGS

The included accompanying drawings are used to provide further understanding of the embodiments of this application, constitute a part of the specification, and are used to illustrate implementations of this application and explain the principle of this application together with literal descriptions. Apparently, the accompanying drawings in the following descriptions are merely some embodiments of this application, and a person of ordinary skill in the art can also obtain other accompanying drawings according to these accompanying drawings without involving any creative effort. In the accompanying drawings.

DETAILED DESCRIPTION OF EMBODIMENTS

Specific structures and functional details disclosed herein are merely representative, and are intended to describe the objectives of the exemplary embodiments of this application. However, this application may be specifically implemented in many alternative forms, and should not be construed as being limited to the embodiments set forth herein.

In the description of this application, it should be understood that orientation or position relationships indicated by the terms such as "center", "transverse", "on", "below", "left", "right", "vertical", "horizontal", "top", "bottom", "inside", and "outside" are based on orientation or position relationships shown in the accompanying drawings, and are used only for ease and brevity of illustration and description, rather than indicating or implying that the mentioned apparatus or component must have a particular orientation or must be constructed and operated in a particular orientation. Therefore, such terms should not be construed as limiting of this application. In addition, the terms such as "first" and "second" are used only for the purpose of description, and should not be understood as indicating or implying the relative importance or implicitly specifying the number of the indicated technical features. Therefore, a feature defined by "first" or "second" can explicitly or implicitly includes one or more of said features. In the description of this application, unless otherwise stated, "a plurality of" means two or more than two. In addition, the terms "include", "comprise" and any variant thereof are intended to cover non-exclusive inclusion.

In the description of this application, it should be noted that unless otherwise explicitly specified or defined, the terms such as "mount", "install", "connect", and "connection" should be understood in a broad sense. For example, the connection may be a fixed connection, a detachable connection, or an integral connection; or the connection may be a mechanical connection or an electrical connection; or the connection may be a direct connection, an indirect connection through an intermediary, or internal communication between two components. Persons of ordinary skill in the art may understand the specific meanings of the foregoing terms in this application according to specific situations.

The terminology used herein is for the purpose of describing specific embodiments only and is not intended to be limiting of exemplary embodiments. As used herein, the singular forms "a", "an" and "the" are intended to include the plural forms as well, unless the context clearly indicates otherwise. It should be further understood that the terms "include" and/or "comprise" when used in this specification, specify the presence of stated features, integers, steps, and/or operations, but do not preclude the presence or addition of one or more other features, integers, steps, operations, and/or combinations thereof.

The following describes this application with reference to the accompanying drawings and alternative embodiments.

Figure 1:
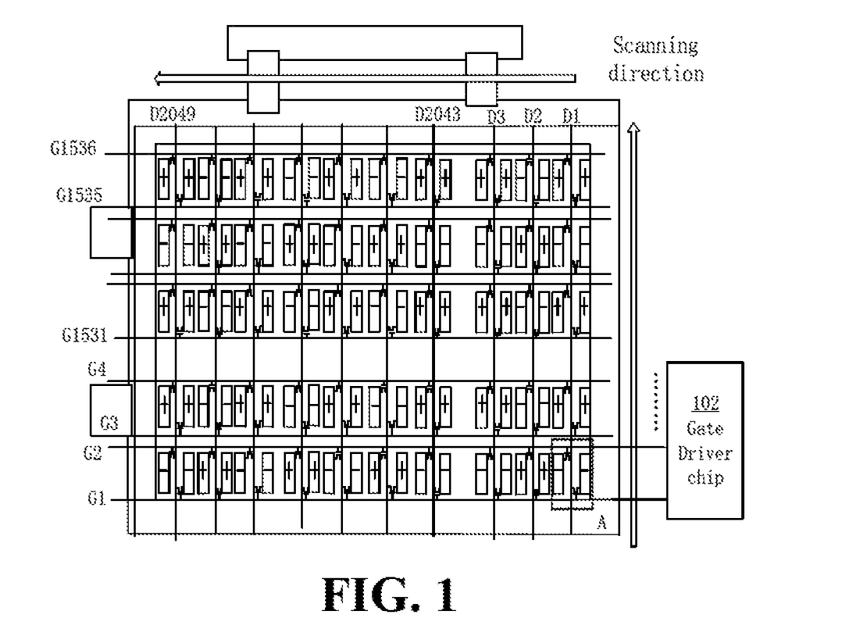
FIG. 1 is a schematic diagram of a half-source driver according to an embodiment of this application.
Figure 2:
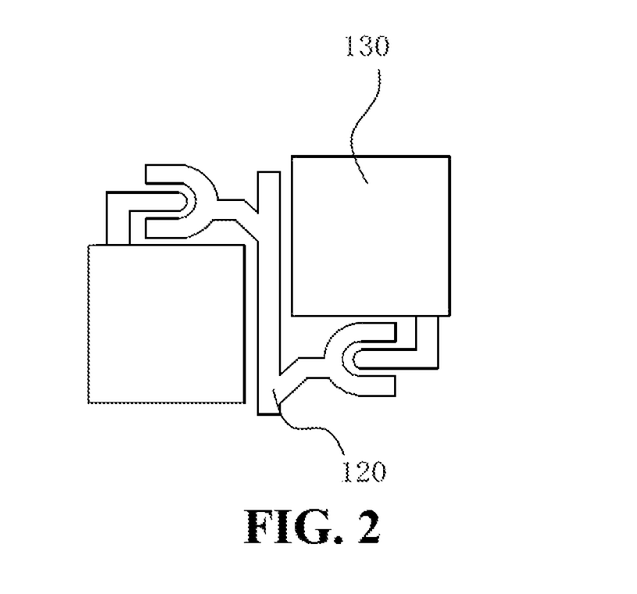
FIG. 2 is a partial enlarged schematic diagram of area A in FIG. 1.
Figure 3:
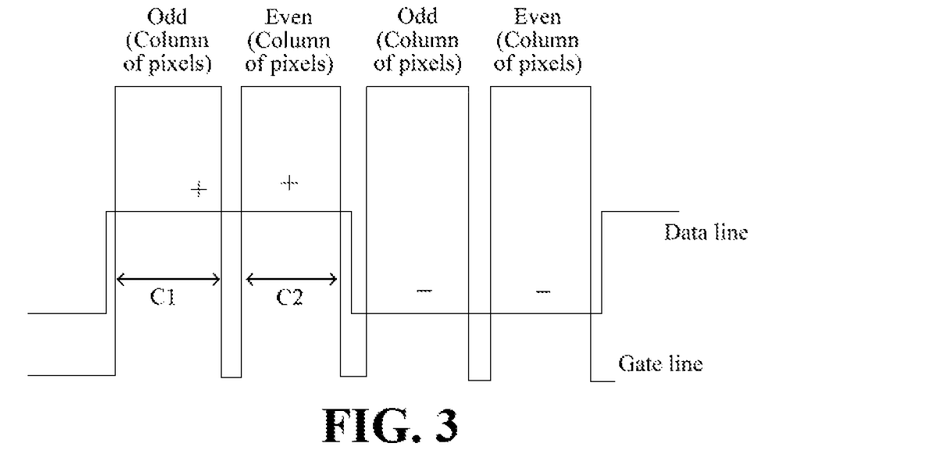
FIG. 3 is a schematic diagram of a data output waveform of the half-source driver according to an embodiment of this application.
Figure 4:
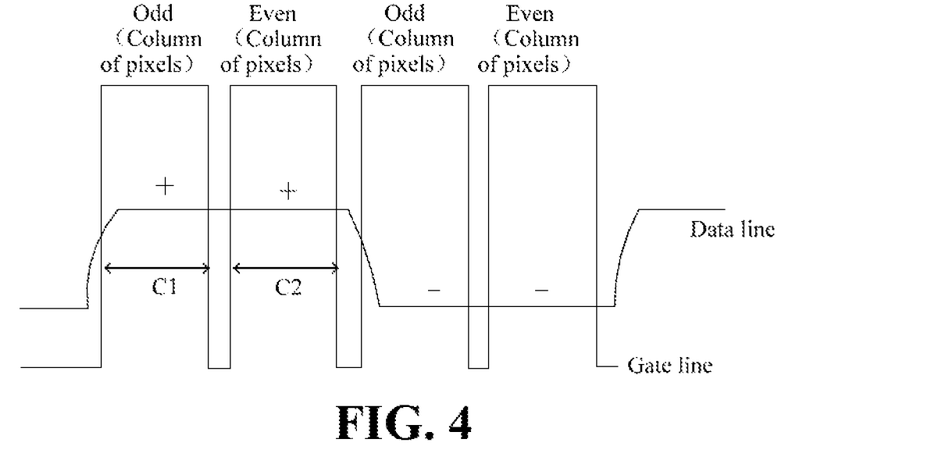
FIG. 4 is a schematic diagram of an actual data output waveform of the half-source driver according to an embodiment of this application.
Figure 5:
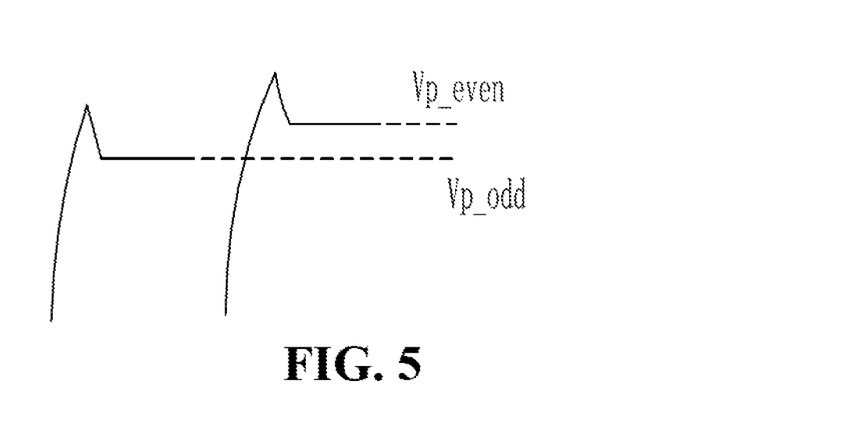
FIG. 5 is a schematic diagram of pixel voltage of the half-source driver according to an embodiment of this application.

Referring to FIG. 1 and FIG. 2, two adjacent columns of pixels share a data line 120, and adjacent pixels are connected to different gate lines 110. When a gate enable signal is turned on, a corresponding row of thin film transistors is turned on. At this time, the data line 120 in a vertical direction sends a corresponding data signal to charge storage capacitors to an appropriate voltage, so as to display a row of image. Referring to FIG. 3 and FIG. 4, Data represents the waveform of the data line 120, and Gate is the waveform of the gate line 110. When the Gate is at the highest peak, an odd column of pixels and an even column of pixels are correspondingly turned on. The data line 120 may be converted between positive and negative polarities. During the positive and negative polarity conversion of the data line 120, the data drive voltage of the corresponding odd column of pixels after the polarity inversion takes certain time to reach a preset voltage, so that the current odd column of pixels and the adjacent even column of pixels sharing the same data line 120 are enabled by the same gate enable signal to have the same turn-on time, where C1 is the turn-on time of the first row of gate enable signal, C2 is the turn-on time of the second row of gate enable signal, and C1=C2; and thus, the final charging states of the two columns of pixels are different. Retelling to FIG. 5, the voltage of the even column of pixels is greater than the voltage of the odd column of pixels, Vp_even is a pixel voltage corresponding to the even column of pixels, and Vp_odd is a pixel voltage corresponding to the odd column of pixels, so that the even column of pixels is brighter than the odd column of pixels, and vertical bright and dark lines exist.

Figure 6:
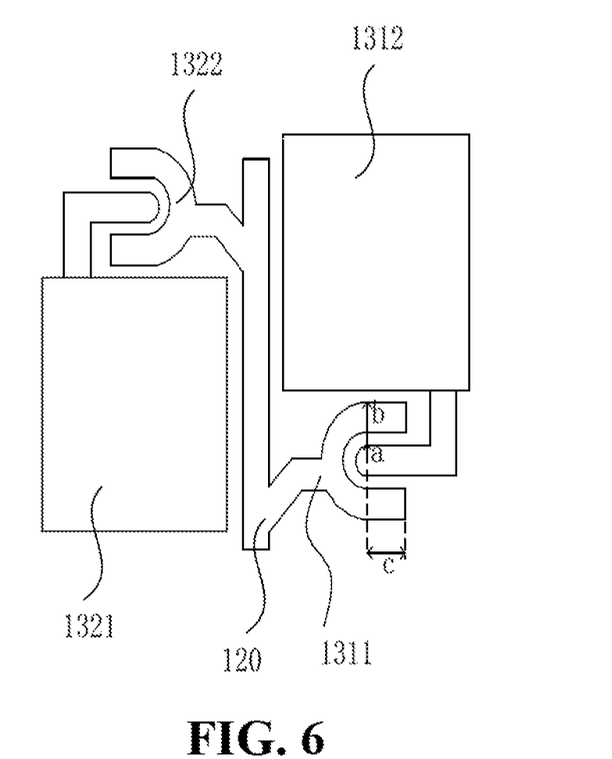
FIG. 6 is a schematic diagram of a pixel structure of a display panel according to an embodiment of this application.
Figure 7:
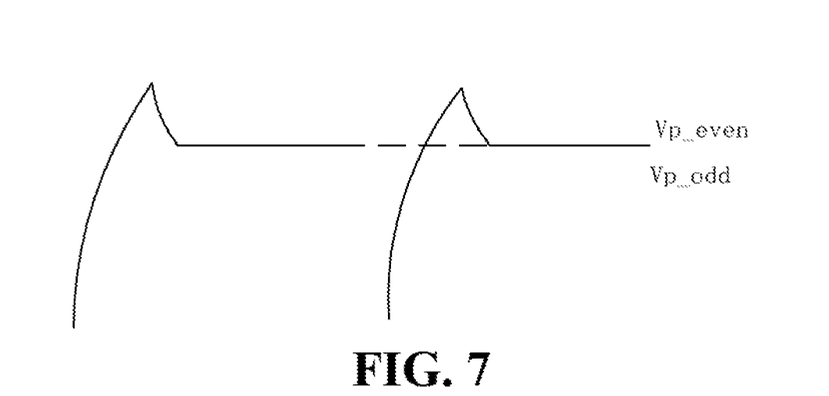
FIG. 7 is a schematic diagram of pixel voltage of the display panel according to an embodiment of this application.

Referring to FIG. 1, FIG. 6 and FIG. 7, an embodiment of this application discloses a display panel, including: a substrate on which a plurality of data lines 120, a plurality of gate lines 110, and a plurality of pixels 130 are arranged, the pixels 130 including sub-pixels of different colors arranged along the direction of the gate lines 110 respectively; and a gate driver chip 102, configured to output gate enable signals to the gate lines 110 to turn on the pixels 130. Each row of the pixels includes a plurality of pixel groups, each of the pixel groups includes a front first column of pixel 131 and a back second column of pixel 132 that are adjacent, the first column of pixel 131 and the second column of pixel 132 are connected to the same data line 120, and the first column of pixel 131 and the second column of pixel 132 are connected to two different gate lines 110. Data drive signals used by each pixel group and the adjacent pixel group in each row of the pixels are opposite in polarity. The channel width-to-length ratio of an active switch corresponding to the second column of pixel 132 is greater than that of an active switch corresponding to the first column of pixel 131.

The positive and negative polarity conversion of the data line 120 causes the data drive voltage corresponding to the second column of pixel 132 in the current group to take a period of time to reverse to a preset voltage level, so that the charging voltage and charging state of the second column of pixel 132 are lower than those of the first column of pixel 131 in the next group, which finally causes a charging voltage difference of the pixels and vertical bright and dark lines. In this solution, if the channel width-to-length ratio of the thin film transistor is larger, the on-state current is heavier, and the charging capability is stronger; with such design, the channel width-to-length ratio of the thin film transistor corresponding to the second column of pixel 132 in the current group is larger than that of the first column of pixel 131 in the next group of the same row, and the charging efficiency and charging capability of the second column of pixel 132 are then stronger than those of the first column of pixel 131 to cancel the problem that the charging voltage of the second column of pixel 132 is lower than that of the first column of pixel 131, thereby reducing and even eliminating the difference in the final charging states of the both, causing the charging voltages of the two adjacent pixels to be the same, and avoiding visual vertical bright and dark lines.

Referring to FIG. 1, FIG. 6 and FIG. 7, in one or more embodiments, the data drive voltages corresponding to the first column of pixel 131 and the second column of pixel 132 are opposite in polarity, the first column of pixel 131 is an odd column of pixel, and the second column of pixel 132 is an even column of pixel; the channel width-to-length ratio of an active switch corresponding to the even column of pixel is greater than that of an active switch corresponding to the odd column of pixel.

In this solution, the first column of pixel 131 is an odd column of pixel, the second column of pixel 132 is an even column of pixel, the channel width-to-length ratio of the thin film transistor corresponding to the even column of pixel is larger than that of the odd column of pixel in such design, and the charging efficiency and charging capability of the even column of pixel are then stronger than those of the odd column of pixel to cancel the problem that the charging voltage of the even column of pixel is lower than that of the odd column of pixel, thereby reducing and even eliminating the difference in the final charging states of the both, causing the charging voltages of the odd column of pixel and the even column of pixel to be the same, and avoiding visual vertical bright and dark lines.

In one or more embodiments, the odd column of pixel 131 includes a first active switch 1311 and a first sub-pixel 1312, the even column of pixel 132 includes a second active switch 1321 and a second sub-pixel 1322, the data line 120 is connected with a drain electrode of the first active switch 1311 and a drain electrode of the second active switch 1321, a source electrode of the first active switch is connected to the first sub-pixel 1312, and a source electrode of the second active switch is connected to the second sub-pixel 1322, where (W/L) odd=m*(W/L) even, m being more than or equal to 0.5 and less than 1.

In this solution, if the channel width-to-length ratio of the thin film transistor is larger, the on-state current is heavier, and the charging capability is stronger. If in is less than 0.5, although the charging efficiency and charging capability of the even column of pixel are stronger than those of the odd column of pixel to partially offset the difference that the charging voltage of the even column of pixel is lower than that of the odd column of pixel, the bright and dark lines still exist. If m is more than 1, the charging efficiency and charging capability of the odd column of pixel are much stronger than those of the even column of pixel, causing more obvious bright and dark lines.

m=0.5, 0.55, 0.6, 0.65, 0.7, 0.75, 0.8, 0.85, 0.9, 0.95 . . . , but not limited thereto.

$$I_{ds} = \mu C_{ox} \frac{W}{L}(V_{gs} - V_{th})^2,$$

Cox is unit area capacitance of a Metal-Insulator-Semiconductor (MIS) structure of a Thin Film Transistor-Liquid Crystal Display (TFT-LCD) device, Vgs is voltage between gate and source electrodes, Vth is threshold voltage, and Ids is drain current.

In one or more embodiments, the channel width-to-length ratio satisfies a formula $$(W/L) = \frac{\pi}{\ln\frac{2c + \pi b}{2c + \pi a}},$$

where W is channel width, L is channel length, a is radius of a source semicircle region, b is horizontal distance from the center of a semicircle to the drain electrode, c is length of a parallel region of two sides of the drain electrode; and the channel width-to-length ratio W/L of the second active switch is greater than the channel width-to-length ratio W/L of the first active switch. The value of the channel width-to-length ratio W/L is realized by the values of a, b, and c, so a, b, and c can be calculated to satisfy the W/L calculation result.

By adjusting parameters affecting the channel width-to-length ratio, the channel width-to-length ratio of the thin film transistor corresponding to the even column of pixel is greater than that of the odd column of pixel, and the charging efficiency and charging capability of the even column of pixel are then stronger than those of the odd column of pixel to offset the difference that the charging voltage of the even column of pixel is lower than that of the odd column of pixel, thereby reducing and even eliminating the difference in the final charging states of the both, causing the charging voltages of the odd column of pixel and the even column of pixel to be the same, and avoiding visual vertical bright and dark lines.

Figure 8:
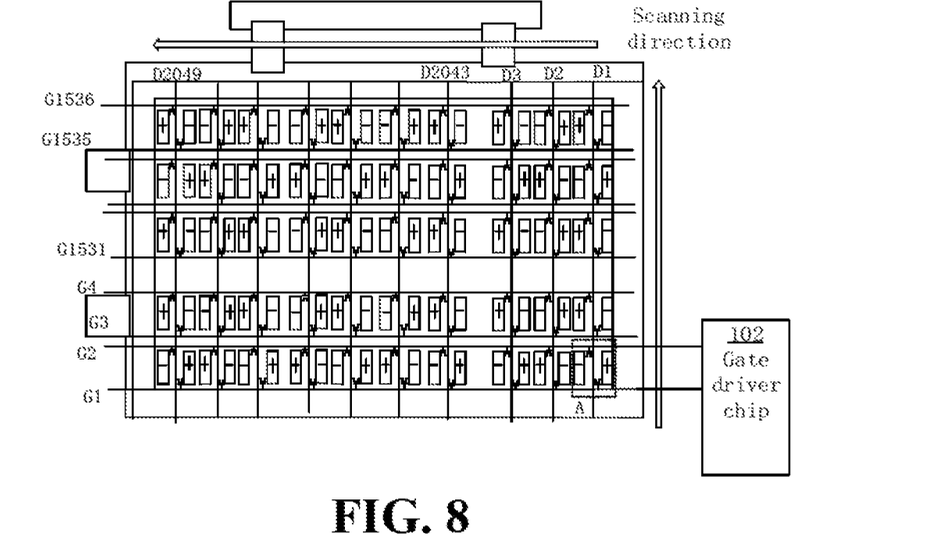
FIG. 8 is a schematic diagram of another half-source driver of the display panel according to an embodiment of this application.
Figure 9:
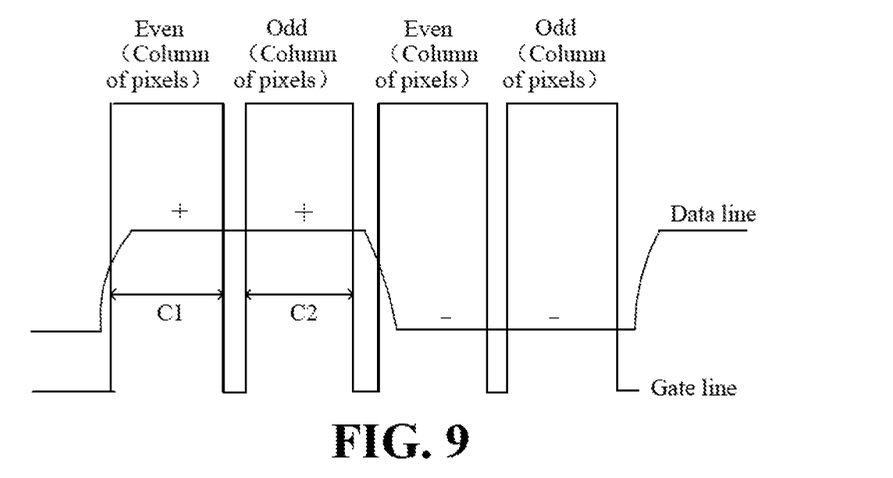
FIG. 9 is a schematic diagram of a driver timing signal of the display panel according to an embodiment of this application.

Referring to FIG. 8 and FIG. 9, in one or more embodiments, the data drive voltages corresponding to the first column of pixel 131 and the second column of pixel 132 are the same in polarity, the first column of pixel 131 is an even column of pixel, and the second column of pixel 132 is an odd column of pixel. The channel width-to-length ratio of an active switch corresponding to the odd column of pixel is greater than that of an active switch corresponding to the even column of pixel.

In this solution, the first column of pixel 131 is an even column of pixel, the second column of pixel 132 is an odd column of pixel, the channel width-to-length ratio of the thin film transistor corresponding to the odd column of pixel is larger than that of the even column of pixel in such design, and the charging efficiency and charging capability of the odd column of pixel are then stronger than those of the even column of pixel to offset the difference that the charging voltage of the odd column of pixel is lower than that of the even column of pixel, thereby reducing and even eliminating the difference in the final charging states of the both, causing the charging voltages of the odd column of pixel and the even column of pixel to be the same, and avoiding visual vertical bright and dark lines.

In one or more embodiments, the even column of pixel includes a first active switch 1311 and a first sub-pixel 1312, the odd column of pixel includes a second active switch 1321 and a second sub-pixel 1322, the data line 120 is connected with a drain electrode of the first active switch 1311 and a drain electrode of the second active switch 1321, a source electrode of the first active switch is connected to the first sub-pixel 1312, and a source electrode of the second active switch is connected to the second sub-pixel 1322, where (W/L) odd=m*(W/L) even, m being more than or equal to 0.5 and less than 1.

In this solution, if the channel width-to-length ratio of the thin film transistor is larger, the on-state current is heavier, and the charging capability is stronger. If m is less than 0.5, although the charging efficiency and charging capability of the odd column of pixel are stronger than those of the even column of pixel to partially offset the difference that the charging voltage of the odd column of pixel is lower than that of the even column of pixel, the bright and dark lines still exist. If m is more than 1, the charging efficiency and charging capability of the even column of pixel are much stronger than those of the odd column of pixel, causing more obvious bright and dark lines.

m=0.5, 0.55, 0.6, 0.65, 0.7, 0.75, 0.8, 0.85, 0.9, 0.95 . . . , but not limited thereto.

$$I_{ds} = \mu C_{ox} \frac{W}{L}(V_{gs} - V_{th})^2,$$

Cox is unit area capacitance of an MIS structure of a TFT device, Vgs is voltage between gate and source electrodes, Vth is threshold voltage, and Ids is drain current.

In one or more embodiments, the channel width-to-length ratio satisfies a formula $$(W/L) = \frac{\pi}{\ln\frac{2c + \pi b}{2c + \pi a}},$$

where W is channel width, L is channel length, a is radius of a source semicircle region, b is horizontal distance from the center of a semicircle to the drain electrode, and c is length of a parallel region of two sides of the drain electrode; and the channel width-to-length ratio W/L of the second active switch is greater than the channel width-to-length ratio W/L of the first active switch.

By adjusting the parameters affecting the channel width-to-length ratio, the channel width-to-length ratio of the thin film transistor corresponding to the odd column of pixel is greater than that of the even column of pixel, and the charging efficiency and charging capability of the odd column of pixel are then stronger than those of the even column of pixel to offset the difference that the charging voltage of the odd column of pixel is lower than that of the even column of pixel, thereby reducing and even eliminating the difference in the final charging states of the both, causing the charging voltages of the odd column of pixel and the even column of pixel to be the same, and avoiding visual vertical bright and dark lines.

In one or more embodiments, the display panel further includes a detection circuit that detects and compares brightness of the first column of pixel 131 and the second column of pixel 132; if the first column of pixel 131 is dark, the charging time C1 corresponding to the first column of pixel 131 and the charging time C2 corresponding to the second column of pixel 132 are adjusted, so that C1 is greater than C2; and if the first column of pixel 131 is bright, the charging time C1 corresponding to the first column of pixel 131 and the charging time C2 corresponding to the second column of pixel 132 are adjusted, so that C1 is smaller than C2.

Although the test has been carried out before production, but in a final product, the actual design effect may be worse than the expected, so the difference in bright and dark lines cannot be completely compensated by only adjusting the different channel width-to-length ratio. The detection circuit detects and compares the actual brightness of the first column of pixel 131 and the second column of pixel 132, and the charging time is adjusted according to the actual situation, so that the final display effect is good. The charging time of the first column of pixel and the second column of pixel can be adjusted by a timing control chip, or by pre-charging or other ways.

As another embodiment of this application, referring to FIG. 1, FIG. 6 and FIG. 7, a display panel 101 is disclosed, including: a substrate on which a plurality of data lines 120, a plurality of gate lines 110, a plurality of pixels, and a gate driver chip 102 are arranged. The pixels include sub-pixels of different colors arranged along the direction of the gate lines 110 respectively. The gate driver chip 102 outputs gate enable signals to the gate lines 110 to turn on the pixels. Each row of the pixels includes a plurality of pixel groups, each of the pixel groups includes a front first column of pixel 131 and a back second column of pixel 132 that are adjacent, the first column of pixel 131 and the second column of pixel 132 are connected to the same data line 120, and the first column of pixel 131 and the second column of pixel 132 are connected to two different gate lines 110. Data drive signals used by each pixel group and the adjacent pixel group in each row of the pixels are opposite in polarity. Data drive voltages corresponding to the first column of pixel 131 and the second column of pixel 132 are opposite in polarity, the first column of pixel 131 is an odd column of pixel, and the second column of pixel 132 is an even column of pixel. The odd column of pixel includes a first active switch 1311 and a first sub-pixel 1312, the even column of pixel includes a second active switch 1321 and a second sub-pixel 1322, the data line 120 is connected with a drain electrode of the first active switch 1311 and a drain electrode of the second active switch 1321, a source electrode of the first active switch is connected to the first sub-pixel 1312, and a source electrode of the second active switch is connected to the second sub-pixel 1322. (W/L) odd=m*(W/L) even, where m is more than or equal to 0.5 and less than 1. A channel width-to-length ratio satisfies a formula $$(W/L) = \frac{\pi}{\ln\frac{2c + \pi b}{2c + \pi a}},$$

where W is channel width, L is channel length, a is radius of a source semicircle region, b is horizontal distance from the center of a semicircle to the drain electrode, and c is length of a parallel region of two sides of the drain electrode. The channel width-to-length ratio W/L of the second active switch is greater than the channel width-to-length ratio W/L of the first active switch. The calculation of W/L is determined by the formula, so a, b and c can be calculated to satisfy the W/L calculation result.

The positive and negative polarity conversion of the data line 120 causes the data drive voltage corresponding to the second column of pixel 132 in the current group to take a period of time to reverse to a preset voltage level, so that the charging voltage and charging state of the second column of pixel 132 are lower than those of the first column of pixel 131 in a next group in the same row, which finally causes a charging voltage difference of the pixels and vertical bright and dark lines. In this solution, if the channel width-to-length ratio of the thin film transistor is larger, the on-state current is heavier, and the charging capability is stronger; with such design, the channel width-to-length ratio of the thin film transistor corresponding to the second column of pixel 132 in the current group is larger than that of the first column of pixel 131 in the next group of the same row, and the charging efficiency and charging capability of the second column of pixel 132 are then stronger than those of the first column of pixel 131, so as to offset the difference that the charging voltage of the second column of pixel 132 is lower than that of the first column of pixel 131, thereby reducing and even eliminating the difference in the final charging states of the both, causing the charging voltages of the two adjacent pixels to be the same, and avoiding visual vertical bright and dark lines.

Figure 10:
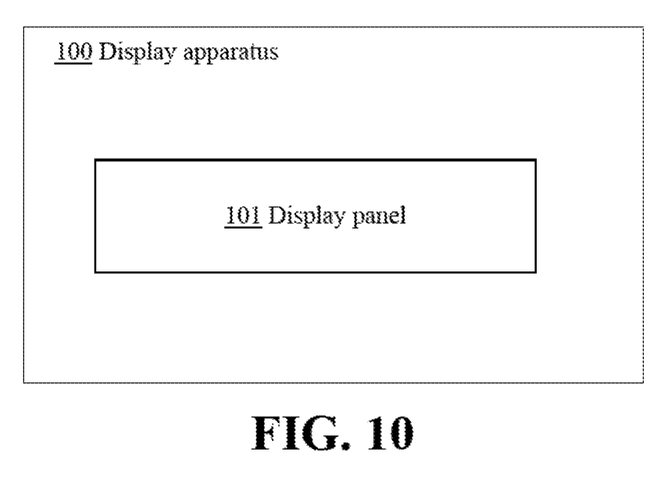
FIG. 10 is a block diagram of a display apparatus according to an embodiment of this application.

As another embodiment of this application, with reference to FIG. 10, a display apparatus 100 is disclosed, including the foregoing display panel 101.

The positive and negative polarity conversion of the data line 120 causes the data drive voltage corresponding to the second column of pixel 132 in the current group to take a period of time to reverse to a preset voltage level, so that the charging voltage and charging state of the second column of pixel 132 are lower than those of the first column of pixel 131 in the next group of the same row, which finally causes a charging voltage difference of the pixels and vertical bright and dark lines. In this solution, if the channel width-to-length ratio of the thin film transistor is larger, the on-state current is heavier, and the charging capability is stronger; with such design, the channel width-to-length ratio of the thin film transistor corresponding to the second column of pixel 132 in the current group is larger than that of the first column of pixel 131 in the next group in the same row, and the charging efficiency and charging capability of the second column of pixel 132 are then stronger than those of the first column of pixel 131, so as to offset the phenomenon that the charging voltage of the second column of pixel 132 is lower than that of the first column of pixel 131, thereby reducing and even eliminating the difference in the final charging states of the both, causing the charging voltages of the two adjacent pixels to be the same, and avoiding visual vertical bright and dark lines.

The panel of this application may be a Twisted Nematic (TN) panel, an In-Plane Switching (IPS) panel, or a Multi-domain Vertical Alignment (VA) panel, and may certainly be any other suitable type of panel.

The foregoing contents are detailed descriptions of this application in conjunction with specific optional embodiments, and it should not be considered that the specific implementation of this application is limited to these descriptions. Persons of ordinary skill in the art can further make simple deductions or replacements without departing from the concept of this application, and such deductions or replacements should all be considered as falling within the protection scope of this application.

What is claimed is:

1. A display panel, comprising:
   a substrate, on which
   a plurality of data lines, a plurality of gate lines, and a plurality of pixels are arranged; and
   a gate driver chip, configured to output gate enable signals to the gate lines to turn on the pixels,
   wherein the pixels comprise sub-pixels of different colors arranged along the direction of the gate lines respectively;
   each row of the pixels comprises a plurality of pixel groups, each of the pixel groups comprises a first-column pixel in front and a second-column pixel in back that are adjacent to each other, the first-column pixel and the second-column pixel are connected to the same data line, and the first-column pixel and the second-column pixel are connected to two different gate lines;
   data drive signals used by the first-column pixel and the second-column pixel in each pixel group in each row have the same polarity; wherein the first-column pixel is an odd-column pixel, and the second-column pixel is an even-column pixel; wherein the data drive signals used by the first-column pixel and the second-column pixel in each pixel group have an opposite polarity to the data drive signals used by the first-column pixel and the second-column pixel in an adjacent group in the same row; and wherein for all pixels in each column, data drive signals used by every two adjacent pixels have opposite polarities; and
   a channel width-to-length ratio of an active switch corresponding to the odd-column pixel is greater than that of an active switch corresponding to the even-column pixel in the same pixel group.

2. The display panel according to claim 1, wherein the first-column of pixel comprises a first active switch and a first sub-pixel, the second-column of pixel comprises a second active switch and a second sub-pixel, the data line is connected with a drain electrode of the first active switch and a drain electrode of the second active switch, a source electrode of the first active switch is connected to the first sub-pixel, and a source electrode of the second active switch is connected to the second sub-pixel,
   wherein m*(W/L) odd=(W/L) even, m being more than or equal to 0.5 and less than 1, where W/L denotes the width-to-length ratio.

3. The display panel according to claim 2, wherein the value of m is one of 0.5, 0.55, 0.6, 0.65, 0.7, 0.75, 0.8, 0.85, 0.9, and 0.95.

4. The display panel according to claim 2, wherein the channel width-to-length ratio satisfies a formula $$W/L = \frac{\pi}{\ln\frac{2c+\pi b}{2c+\pi a}},$$

wherein W is channel width, L is channel length, a is radius of a source semicircle region, b is horizontal distance from the center of the semicircle to the drain electrode, and c is length of a parallel region of two sides of the drain electrode; and
the channel width-to-length ratio W/L of the second active switch is greater than the channel width-to-length ratio W/L of the first active switch.

5. A display apparatus, comprising a display panel according to claim 1.

6. The display apparatus according to claim 5, wherein the display apparatus is one of a twisted nematic display apparatus, an in-plane switching display apparatus, and a multi-domain vertical alignment display apparatus.

* * * * *